Figure 1:
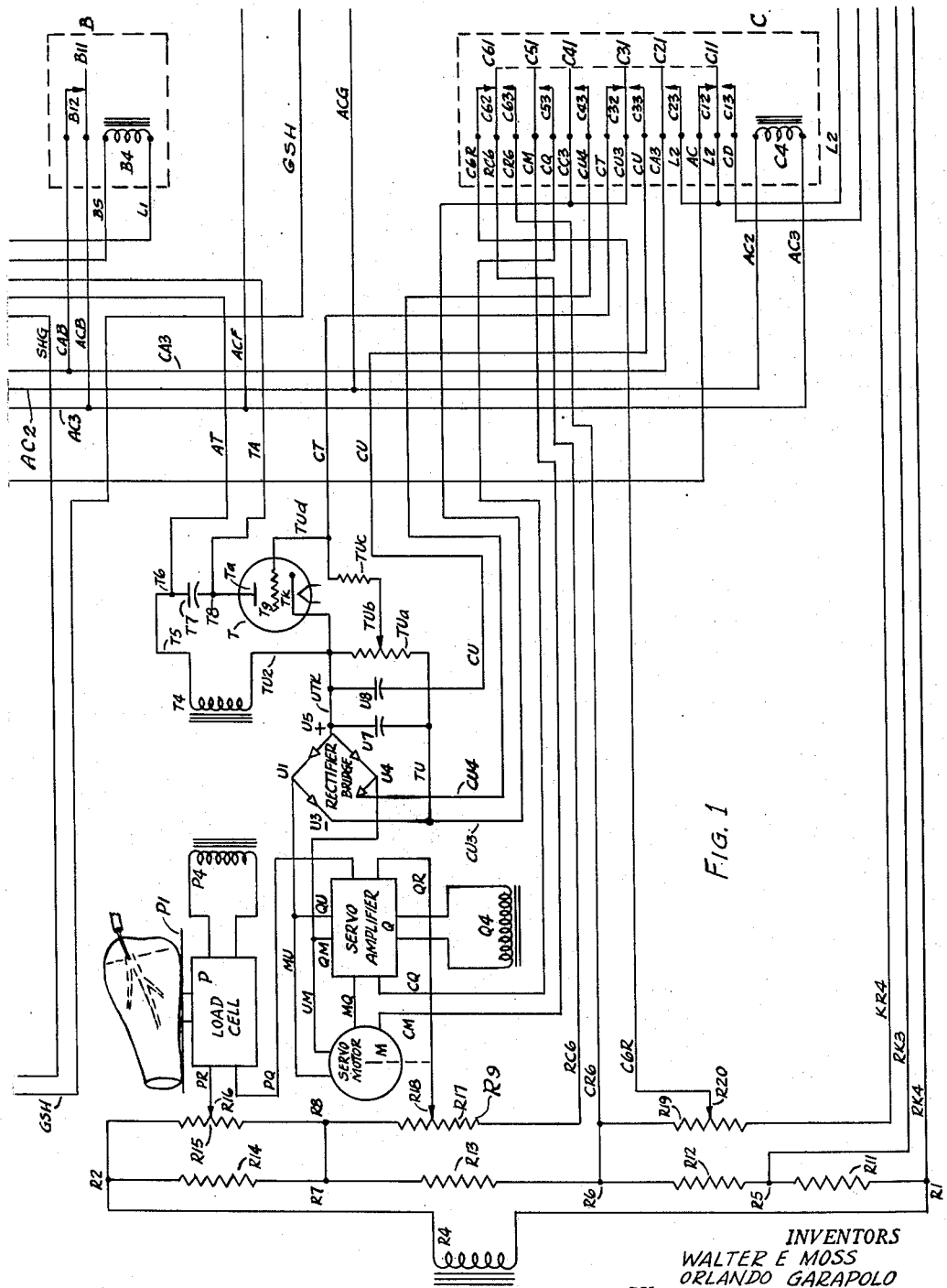
Figure 2:
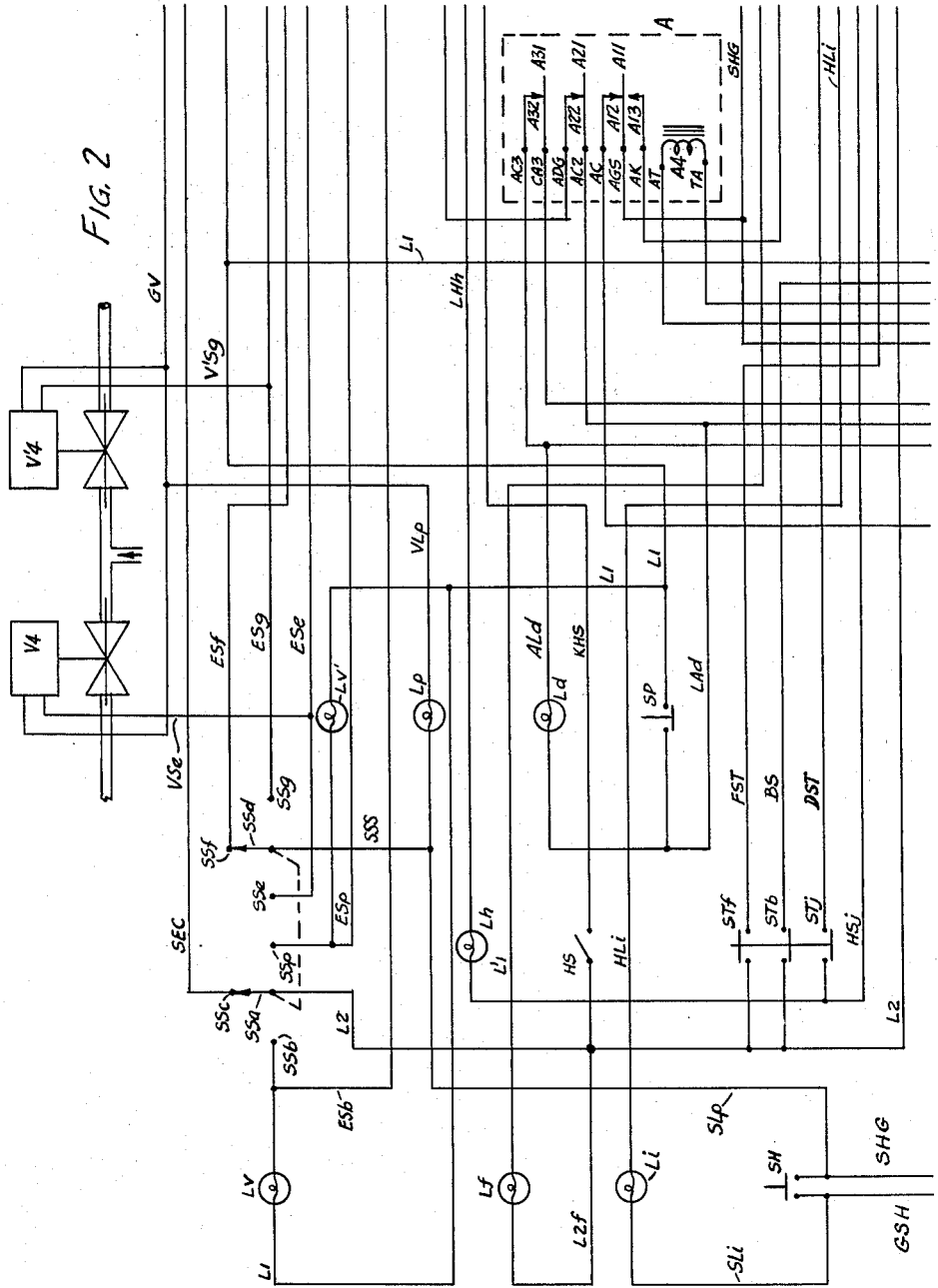
Figure 3:
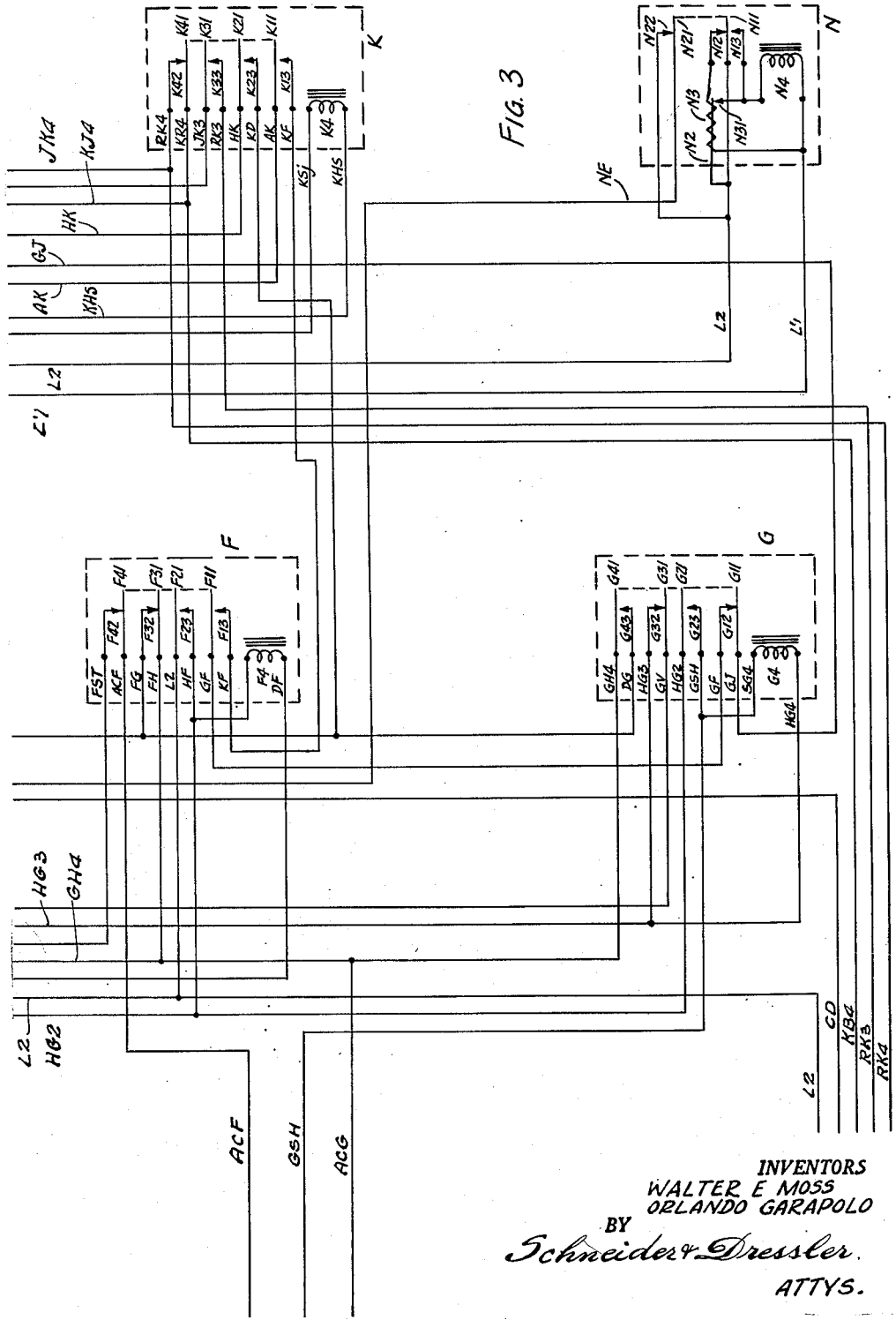

Feb. 9, 1954  W. E. MOSS ET AL  2,668,493
WEIGHING SYSTEM

Filed Oct. 10, 1952  4 Sheets-Sheet 1

INVENTORS
WALTER E MOSS
ORLANDO GARAPOLO
BY
Schneider & Dressler.
ATTYS.

Feb. 9, 1954 — W. E. MOSS ET AL — 2,668,493
WEIGHING SYSTEM
Filed Oct. 10, 1952 — 4 Sheets-Sheet 3

INVENTORS
WALTER E MOSS
ORLANDO GARAPOLO
BY Schneider & Dressler
ATTYS.

Feb. 9, 1954  W. E. MOSS ET AL  2,668,493
WEIGHING SYSTEM
Filed Oct. 10, 1952  4 Sheets-Sheet 4

INVENTORS
WALTER E MOSS
ORLANDO GARAPOLO
BY
Schneider & Dressler.
ATTYS.

Patented Feb. 9, 1954

2,668,493

UNITED STATES PATENT OFFICE 2,668,493

WEIGHING SYSTEM

Walter E. Moss, Brookfield, and Orlando Garapolo, Chicago, Ill., assignors to Wilson & Co., Inc., a corporation of Delaware Application October 10, 1952, Serial No. 314,108

11 Claims. (Cl. 99—256)

This invention relates to a weighing system and is an improvement upon the system disclosed and claimed in our prior Patent 2,605,694, issued August 5, 1952.

In the above patent we have disclosed and claimed a weighing system wherein means are provided for controlling the duration of a processing cycle on a material whose base weight is to be changed by a predetermined proportion thereof during processing. In the patent referred to, we have illustrated the invention therein disclosed and claimed by referring specifically to a system for controlling the pickling of hams.

In pickling hams, it is customary to inject a brine or other pickling fluid into the vascular system of a ham to increase the weight by a predetermined percentage of the base weight of the ham. The system disclosed and claimed therein includes as a part thereof a conventional scale cooperating with a means, such as a disc having alternate transparent and opaque portions, for generating electrical impulses in proportion to a change in weight upon the scale platform. The system forming the subject matter of the present invention is an improvement upon the previously described system and includes a self-contained scale system having a resistance element which varies in proportion to the weight upon the scale platform. This self-contained scale system is more rugged than the scale system previously described and referred to. Because of the presence of brine, as well as the conditions of high humidity and low temperature present during the ham pickling operation, it has been found that conventional scales require frequent service. Thus the knife-edge supports and other mechanism forming part of a scale system is frequently subject to deleterious corrosive action under normal operating conditions.

We have found that a scale utilizing a resistance-type strain gauge may be constructed in such a manner that the operating parts are hermetically sealed and thus are protected against corrosion and dirt, both present under normal conditions in many industrial operations, and particularly in the case of brine treatment of hams or other articles of food. Strain gauges consist of a resistance element whose resistance is varied by elongation in a manner proportional to the weight upon a scale beam. Scales using such strain gauge members are well known and have great sensitivity while being rugged and susceptible to withstanding corrosion and other adverse operating conditions.

The output of a scale containing a strain gauge as its operating element is in the form of a resistance variation which may be transformed readily into a potential or current variation. Because of the nature of the gauge output, it is not possible to utilize the pulse generating portion of the system disclosed and claimed in our prior application. Instead, we have devised a system for utilizing a strain gauge type of scale, said system serving to control the duration of a processing cycle during which the base weight of a material or article may vary by a predetermined percentage, the base weight itself having a possible range of values within limits.

In general, a system embodying our invention first operates to determine the base weight. Then the system operates a control to permit initiation of processing the article whose base weight is to be varied and also computes the new weight to be attained by processing. After the processing has varied the base weight by a predetermined percentage, the system operates a control to terminate processing.

For a more detailed description of our invention, reference will now be made to the drawings wherein one form of a system embodying our invention is disclosed, it being understood, however, that the system disclosed is exemplary and that variations in the system and portions thereof may be made without departing from the spirit of the invention.

Figure 5:
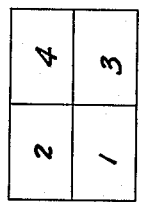
Figure 4:
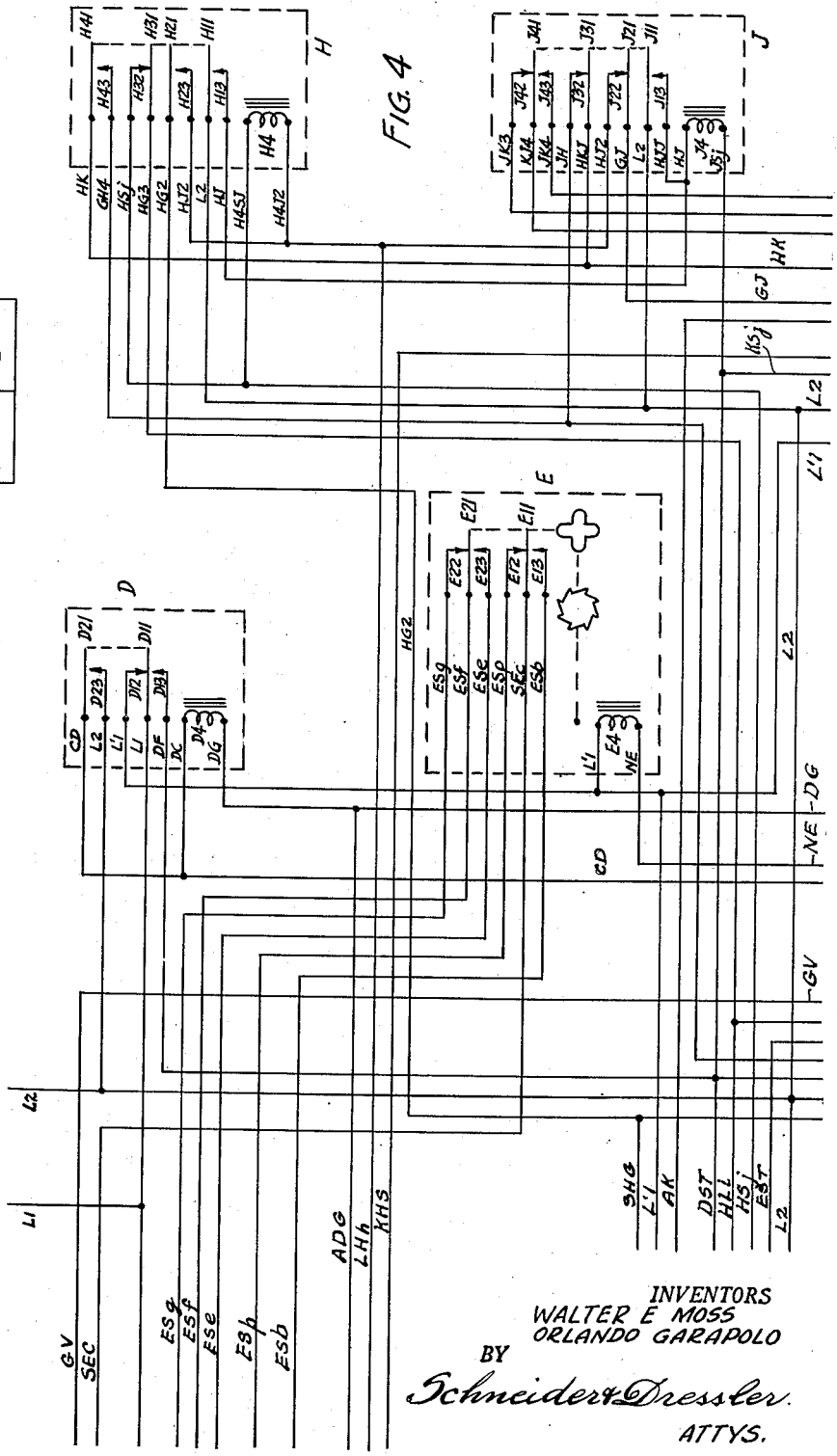

Referring therefore to the drawings:

Figures 1 to 4 inclusive are diagrammatic showings of circuits and apparatus of the system embodying the invention, each figure showing a portion of the system;

Fig. 5 is a view illustrating the manner in which Figures 1 to 4 inclusive are assembled to show the entire system.

The system shown in detail in Figures 1 to 4 inclusive comprises relays A to H inclusive, J, K and N. The system also includes a strain gauge or load cell P for generating a potential proportional to the weight of the ham. There are also included servo amplifier Q and motor M together with additional components as tube T, resistors, switches, lamps and the like. Power supply lines L1 and L2 provide alternating current to various transformers, relays and lamps to energize the system.

Load cell P comprises a resistance network connected in the general manner of a bridge. At least one arm of this bridge has disposed therein a resistance member the value of which is varied by elongation. Such a resistor and a circuit therefor is disclosed for example, in United States Patent 2,292,549 and has been used in various mechanisms where strains are to be measured. The bridge forming the entire cell is supplied with alternating current at a constant peak potential from winding P4. It is understood that this winding and other windings are part of a transformer whose primary may be supplied from lines L1 and L2.

In general, the load cell has an isolated supply potential in winding P4 connected across two of the bridge points with an output circuit connected across the remaining two bridge points. The entire cell is so arranged with reference to scale platform P1 so that the cell output is varied in a manner proportional to the weight upon the platform. Inasmuch as the structure for utilizing such a load cell in connection with a scale forms no part of the present invention and since such mechanism is well known, a detailed description thereof will not be given.

The output of cell P is fed by wire PR to a resistance network, generally indicated by R, and by wire PQ to one input of servo-amplifier Q. This amplifier has winding Q4 for supplying alternating current to the various portions of the amplifier for energizing the same. Amplifier Q has wire QR going to network R.

Referring to network R, points R1 and R2 are supplied from winding R4 with alternating current at a suitable and constant peak potential. Between points R1 and R2 there are connected one series of resistors R11, R12, R13, and R14. Junction points R5, R6 and R7 are provided between resistors R11 to R14 inclusive. From R2, resistor R15 goes to junction point R8, this being connected by a short lead to junction point R7. Resistor R17 has one terminal connected to junction R3 while the other terminal R9 is connected to lead RC6 to be described later. Resistor R19 is connected between junction R6 and lead KR4 also to be described later.

Cooperating with resistor R15 is wiper R16 connected to lead PR. Resistor R17 has wiper R18 cooperating therewith, this wiper being connected to lead QR. Resistor R19 has wiper R20 connected to lead C6R. The adjustment of R20 will determine the percent increase in weight to be pumped.

Referring now to servo-motor M, wires MU and UM go from one phase of the motor to points U1 and U4 of a full wave rectifier U. As is well known, motor M is generally a two-phase motor so arranged that the motor will go in one direction or the other, depending upon the relationship between the phases.

Servo-amplifier Q is connected by leads QU and QM to wires MU and UM respectively.

Rectifier U has points U1, U3, U4 and U5 as shown, between which points there are provided arms containing rectifiers. These rectifiers may be of any type such as gas discharge tube type, selenium type, copper oxide or any other type desired. With the exception of the arm between bridge points U3 and U4, the arms are complete. The rectifiers are so poled that point U5 is positive and point U3 is negative.

From bridge point U3, a connection goes by way of wire CU3 and TU to one terminal of resistor TUa, the other terminal of this resistor being connected by wire TU2 to a terminal of winding T4. Winding T4 is adapted to have generated therein alternating current at suitable potential. Winding T4 has its other terminal connected by wire T5 to junction point T6. Condenser T7 is connected between junction point T6 and junction point T8. Junction T8 is connected to anode Ta of gas discharge tube T. This gas tube has cathode Tk and control grid Tg. Tube T is of the type available on the market wherein initiation of space current is controlled or triggered by a grid. As is well known in such tubes, once the control grid permits a discharge to occur, it loses control over the discharge unless the discharge in the cathode and anode is extinguished, as by reversal of potential.

Connecting cathode Tk, wire TU2 and bridge point U5 is lead UTk. Condenser U7 is connected between wire UTk and wire TU thus disposing it across the bridge output. Cooperating with resistor TUa is wiper TUb which is connected to grid resistor TUc. The upper terminal of resistor TUc is connected by wire TUd to control grid Tg.

From junctions T6 and T8 wires AT and TA go to winding A4 of relay A. Relay A has movable contacts A11, A21 and A31. Contact A11 operates between normal contact A12 and off-normal contact A13. Movable contacts A21 and A31 cooperate with normal contacts A22 and A32.

Contact A13 is connected to wire AK going to a contact in relay K to be later described. Contact A11 is connected to wire AGS, this wire being connected to wire SHG, this latter wire going from a junction point on wire HG2 and a contact on interrupt switch SH to be described later. Contact A12 is connected by wire AC to a contact on relay C. Contacts A21, A31 and A32 are respectively connected to wires AC2, CA3 and AC3 to contacts in relay C, to be described later. Contact A22 is connected to wire ADG, this wire going to wire DG.

Wire AC2 is connected to wire LAd going to one terminal of stop switch SP and also one terminal of delay lamp Ld. The other terminal of lamp Ld is connected by wire ALd to wire AC3. The other terminal of stop switch SP is connected to a branch of supply wire L1.

Referring now to wire CA3, lead CAB branches off therefrom and goes to normal contact B12 of relay B. This relay has movable contact B11 connected by wire ACB to wire AC3. Relay B has its winding B4 connected respectively to supply wire L1 and wire BS going to one terminal of switch section STb of gang start switch ST. The other terminal of switch section STb is connected to a branch of L2.

Referring now to relay C, winding C4 of this relay is connected to wires AC2 and AC3, respectively. This relay has a bank of movable contacts C11, C21, C31, C41, C51, and C61. Movable contact C11 operates between normal contact C12 and off-normal contact C13. Similarly, movable contacts C31 and C61 operate between normal contacts C32 and C62 on the one hand and off-normal contacts C33 and C63. Contacts C21, C41 and C51 cooperate respectively with off-normal contacts C23, C43 and C53.

Contact C13 is connected to wire CD going to relay D. Movable contact C11 and off-normal contact C23 are both connected to branches of line wire L2. Contact C12 is connected to wire AC. Contact C21 is connected to wire CA3. Contact C33 is connected by wire CU to one terminal of condenser U8, the other terminal of this condenser being connected to wire UTk. Contact C31 is connected by wire CU3 to point U3 of rectifier bridge U. Relay contact C32 is connected by wire CT to wire TUd.

Contact C43 of the relay is connected by wire CU4 going to the free terminal of the rectifier extending from bridge point U4 toward point U3. Contact C41 is connected to wire CC3 which in turn is connected to CU3. Contact C52 is connected by wire CQ to one of the output terminals of servo-amplifier Q. The other output terminal of the amplifier is connected by wire MQ to one terminal of the second phase winding of motor M. Relay contact C51 is connected by wire CM to the other terminal of second phase winding of M.

Contact C63 is connected by wire CR6 to junction R6 on network R. Contact C61 is connected by wire RC6 to terminal R9 of resistance element R17. Relay contact C62 is connected by wire C6R to wiper R20 cooperating with resistance element R19.

Referring now to wire CD connected to contact C13, this wire is connected to contact D21 of relay D. Branch DC from wire CD is connected to one terminal of winding D4 of this relay. The lower terminal of this winding is connected to wire DG. Relay D has movable contacts D11 and D21, the latter having already been referred to. Movable contact D11 operates between normal and off-normal contacts D12 and D13 respectively. The other movable contact D21 cooperates with off-normal contact D23. Contact D23 is connected to a branch of supply wire L2. Contact D12 is connected to wire L'1. Movable contact D11 is connected to line wire L1. Contact D13 is connected to wire DF.

Referring to wire L'1, a connection is made therefrom to the top terminal of winding E4 of ratchet relay E. This type of relay consists of conventional movable and stationary contacts but has a ratchet mechanism so that the movable contacts remain in either normal or off-normal position irrespective of the conditions of the windings. Inasmuch as such relays are well known, a detailed description of the mechanical construction is not given.

Returning to winding E4, the lower terminal thereof is connected to wire NE. Ratchet relay E has two movable contacts E11 and E21. These two contacts operate between upper and lower contacts respectively, E12 and E22 on the one hand and E13 and E23 on the other hand. As has been pointed out before, energization of winding E4 merely causes the movable contacts to change position so that for each energization of winding E4, these contacts move alternately from the upper contacts to the lower contacts and back again.

Contact E12 is connected by wire ES$p$ to terminal SS$p$ of selector switch SS. Contact E11 is connected to wire SE$c$. Contact E13 is connected to wire ES$b$. Contact E23 is connected to wire ES$e$. Contact E21 is connected to wire ES$f$. Contact E22 is connected to wire ES$g$. All these wires going to the various contacts of relay E are connected to various terminals of selector switch SS to be described later.

Referring now to relay F, winding F4 has its lower terminal connected to wire DF, while the upper terminal is connected to wire HF. Relay F has four movable contacts, F11, F21, F31 and F41. Contacts F11 and F21 cooperate respectively with off-normal contacts F13 and F23. The remaining two contacts F31 and F41 cooperate respectively with normal contacts F32 and F42.

Contact F13 is connected to wire KF. Contact F11 is connected to wire GF. Contact F23 is connected to wire HF, this wire being in turn connected to wire HG2. Contact F21 is connected to a branch of supply wire L2. Contact F31 is connected to wire FH, this wire is connected in turn to wire GH4. Contact F32 is connected by wire FG to wire DG. Contact F41 is connected to wire ACF, which in turn is connected to wire AC3. Contact F42 is connected to wire FST going to one terminal of switch section ST$f$ of start switch ST. The other terminal of this switch section is connected to a branch of L2.

Referring now to relay G, this has winding G4 and movable contacts G11, G21, G31 and G41. Winding G4 has its lowest terminal connected to wire HG4 which in turn is connected to wire HG3. The upper terminal of winding G4 is connected by wire SG4 to wire GSH. This latter wire is connected to contact G23. Contact G11 is connected to wire GJ. Contact G12 is connected to wire GF. Contact G21 is connected to wire HG2. Contact G31 is connected to wire GV. Contact G32 is connected to wire HG3. Contact G43 is connected to wire DG while contact G41 is connected to wire GH4. Wire GH4 is connected by wire ACG to wire AC2 and also goes to contact H43 of relay H.

Movable contact H41, cooperating with off-normal contact H43, is itself connected to wire HK. Relay H has winding H4 connected to wires H4J2 and H4S$j$. Off-normal contact H13 of this relay is connected to wire HJ while cooperating movable contact H11 is connected to a branch of L2.

Off-normal contact H23 is connected to wire HJ2 while its cooperating movable contact H21 is connected to wire HG2. Movable contact H31 is connected to wire HG3 while the cooperating normal contact H32 is connected to wire HS$j$.

Referring now to relay J, this has winding J4 and movable contacts J11, J21, J31 and J41. Contact J11 is connected to wire L2. The cooperating off-normal contact J13 is connected by wire HJJ to the upper terminal of winding J4 of the relay. Movable contact J21 is connected to wire GJ while the cooperating normal contact J22 is connected to wire HJ2. Movable contact J31 is connected to wire HKJ, which in turn is connected to wire HK. The cooperating normal contact J32 is connected by wire JH to wire GH4. Off-normal contact J43 is connected to wire JK4. Movable contact J41 is connected to wire KJ4. The cooperating normal contact J42 is connected to wire JK3. Winding J4 is connected respectively to wires HJ and JS$j$. Wire JS$j$ is connected to wire DF and also goes to one terminal of start switch section ST$j$, the other terminal of this switch section being connected to wire HS$j$. Wire HS$j$ goes to one side of half-pumped lamp L$h$, the other side being connected by wire LH$h$ to wire HJ2.

Referring now to relay K, this has winding K4 and movable contacts K11, K21, K31 and K41. The top terminal of winding K4 is connected to wire KS$j$, which in turn is connected to wire JS$j$. The lower terminal of winding K4 is connected to wire KHS which goes to one terminal of half-pump switch HS, the other terminal of this switch being connected to wire L2. Lamp L$f$ for indicating the end of pumping is connected between this branch of L2 and a branch of L'1.

Contact K13 is connected to wire KF going back to relay F. Contact K11 is connected to wire AK. Contact K23 is connected to wire KD which in turn is connected to wire DG. The cooperating movable contact K21 is connected to wire HK. Off-normal contact K33 is connected to wire RK3 which goes to junction R5 of resistance network R. The cooperating movable contact K31 is connected by wire JK3 to relay J. Movable contact K41 is connected to wire KR4, which in turn is connected to the lower terminal of resistor R19 in the resistor network R. Cooperating normal contact K42 is connected by wire RK4 to terminal R1 of resistance network R.

The last relay N is an overload relay and has winding N4 and movable contacts N11 and N21. Winding N4 has its lower terminal connected to a branch of wire L'1 while the upper terminal is connected to contact N13 and also to contact N31. This latter contact cooperates with thermostatic element N2 connected to wire L2, this wire also being connected to movable contact N11. Disposed around thermostatic element N2 is heater N3 which is connected between wire L'1 and contact N12. Normal contact N22 is connected to L2. The cooperating movable contact N21 is connected to wire NE, this latter wire going to the lower terminal of winding E4 of the ratchet relay.

Referring now to switch SH, this is an interrupt switch connected across wires GSH and SHG. Connected to wire GSH is wire SLi, this wire going to interrupt lamp Li. The other terminal of this interrupt lamp is connected to wire HLi going to wire HG3. Referring back to interrupt switch SH, wire SHG is connected by wire SLp to one terminal of pumping lamp Lp. The other terminal of this lamp is connected to wire VLp. This latter wire is connected to wire GV which is a common return for winding V4 and V'4 of two electrically operated valves V and V' for controlling flow of brine. These valves are normally closed.

Referring now to selector switch SS, this has movable contacts SSa and SSd. These two contacts are adapted to be moved simultaneously and cooperate respectively with two groups of three contacts each. Thus referring to contact SSa, the three stationary contacts are SSb, SSc and SSp. Contact SSb is connected to one terminal of lamp Lv, the other terminal of this lamp being connected to line wire L1. Contact SSa is connected to wire L2. Contact SSc is connected to wire SEc. Contact SSp is connected to wire ESp.

Referring now to the second section of this switch, movable contact SSd is connected by wire SSS to wire SLp. Fixed contact SSe is connected to wire ESe. Fixed contact SSf is connected to wire ESf. The last contact SSG is connected to wire ESg.

From wire ESp, a connection goes to lamp Lv', the other terminal of this lamp being connected to line wire L1. From wire ESe, a connection VSe goes to the lower terminal of operating winding V4 of valve V. Similarly, wire V'Sg goes from wire ESg to the lower terminal of winding V'4 of valve V'.

The operation of the system, so far described, will now be given in general terms without attempting to trace any circuits in detail, this following later.

*Normal pumping*

All of the components of the system are shown in normal rest position. When power from lines L1 and L2 is applied to the system, relays B and E will close and heater N3 will be energized. Energization of N3 will cause N2 to close against N31 and release E unless an operating cycle has previously been initiated. Remaining relays will stay off. Assume that the selector switch SS is in the position shown, the system will be in a stand-by condition for normal automatic operation. Also let it be assumed that a ham has been placed upon platform P1 so that the load or strain cell P responds with a certain potential at output wires PR and PQ. Also assume that wiper R20 is adjusted to the desired point for providing a desired increase in weight during the pumping. With the ham on the platform and the pumping needle inserted in the ham, start switch ST is momentarily depressed.

When the start switch is in a down position, relay B will be shut off by section STb, opening up the circuit for the relay winding. The opening of relay B provides a shunt for contacts A31—A32, controlling the winding of relay C. This action provides time for the servo-mechanism to reach a stable condition after relay C has closed.

At the same time, while start switch ST is still depressed, a circuit for relay winding C4 will be closed through switch section STf. As soon as relay C closes, it locks itself in. Inasmuch as there is no substantial change in the condition of the system, whether the start switch is still down or is released, it will be assumed that this switch is released. The only change is that relay B closes again. However, during normal starting, this energization of relay B has no effect upon the operation.

As the result of energization of relay C, relay D is also energized and locks itself in. Light Ld goes on with the pressing of the start switch to indicate the beginning of a delay period. During this delay period, the system will automatically weigh the ham, determine the weight to which the ham should be pumped and then condition itself for pumping.

When relay C closes or is energized, servo motor M goes into operation and moves wiper R18 along resistor R17 until the potential at the terminal of potential cell P is equal to the potential between R13 and R16. The potential of the cell and the potential in resistance network R must be 180° out of phase and, as shown here, are connected in series with each other so that the net potential difference into amplifier Q should be zero.

Other arrangements for obtaining a potential balance are possible, such null point determination with servo-mechanism being well known and extensively used. The series arrangement of potentials and out of phase disposition of these two potentials is merely one example.

It has been assumed, of course, that the position of wiper R18 at the beginning of the operating cycle has been such that when relay C closed, no balance existed between the output of P and the two points in network R. If by chance, the wiper had been in the correct position, then certain steps, now described, would have been eliminated.

Continuing, when relay C closes, rectifier system U is changed to full wave. Condenser U7 across the output of this rectifier is provided for the purpose of correcting the phase shift introduced by amplifier Q. Also relay C, when it closes, connects condenser U8 across the output of the rectifier to stabilize the action of the relay in the event that servomotor M should begin to hunt. As a rule, anti-hunt means are usually provided in servo systems. However, sometimes a servo installation will overshoot and then tend to return to its final position.

Servomotor M will only operate if the amplifier output to the motor will have a substantial potential. Thus as an example, in the system used, the amplifier output potential ranges from about zero to as high as 150 volts A. C. Servomotor M will operate over a predetermined potential range, in this example, the range being from about 20 volts up to the maximum. Any amplifier output below about 20 volts is, for all practical purposes, considered to be zero and the servomechanism is thus considered to be in balance. However, other limits, either greater or less, may be used.

In the example given, by proper choice of resistors, the zero range of about 20 volts for the amplifier output would introduce negligible error in the operation of the system. It is thus evident that if motor M would happen to overshoot and the potential across the amplifier output drop to zero and then rise again with reverse phase, the presence of condenser U8 would stabilize the bridge output. U8 also prevents chatter of relay C.

While relay C is energized, grid controlled gas tube T is biased by resistor TUc branching off from resistor TUa. This resistance network for biasing tube T is desirable because the minimum voltage or potential necessary to drive servo-motor M is greater than the cut-off potential of tube T as connected herein. It is possible, of course, to operate tube T under such potential conditions that the cut-off potential of this tube T is about the same as motor M. However, tube T is, as a rule, much more sensitive to variation in potential at the cutoff region than is motor M so that equalizing the two will provide little benefit.

Assuming now that motor M has moved wiper R18 and equalized the potential from P and the two points in R, the output of amplifier Q drops to 20 volts or less. This means, therefore, that the potential across U5 and U3 drops to 20 volts or less and the bias on the grid of tube T with respect to the cathode also drops. Because of the operation of the network in the input circuit of tube T, the bias of the grid will be just above cutoff for the tube when the output of amplifier Q is below the value required for operating motor M. Tube T fires and closes the circuit for the winding of relay A.

When relay A closes, relay C releases. When this relay releases, it cuts off one phase of motor M, thus disabling the servo system from further operation. At the same time, rectifier U becomes a half-wave rectifier and the grid bias network for tube T is modified. This network now changes the bias on the grid of tube T so that the cutoff characteristic is dependent more upon phase difference between grid potential and the anode cathode potential than on potential alone. This renders tube T more sensitive so that this tube which cuts off pumping when the ham has reached a predetermined weight is in a sensitive condition for terminating the pumping at the desired precise weight.

At the same time, when relay C is deenergized, the network conditions in R are changed so that the potential due to R is no longer in balance with the potential due to P. The difference in potential between the two is such that P must have an output potential corresponding to the desired increase in the weight of the ham to balance the new potential in R. The servo system remains locked because of relay C being off.

Relay D which has closed earlier in the cycle, now permits circuits to be established so that relay F closes and energizes the winding of one of the valves V or V'. The particular valve that will operate will depend upon the position of ratchet relay E. With pumping initiated, the potential output from P increases until a new balance between P and R is established. When this occurs, tube T fires, and relay A closes. This disables relay D and causes valve V to cut off.

Relay E is controlled by relay D, and is operated when D goes from on to off position. Relay E controls which valve is active and the corresponding indicating light.

Two stage pumping

In case it is desired to break a pumping cycle into two stages, as is necessary with certain hams, the operator closes switch HS for half pumping. It is necessary that switch HS be closed before the end of the first stage pumping point. The starting and servo-balancing part of the operation is the same as with conventional pumping. However, the closure of switch HS closes relay K during the first part of the pumping cycle. This results in the rearrangement of the network of resistors R so that the new R derived potential to balance the increased weight derived potential corresponds to one half (or any other desired part) of the weight to be added.

When the first half of the pumping cycle terminates, relay D still remains locked and relay F remains energized, this relay being energized during pumping. However, the winding for the active valve is deenergized so that pumping ceases.

When the first half of pumping has terminated, relay K is deenergized and network R is arranged so that the new R derived potential for balancing the weight potential is normal for a full pumping cycle. When pumping is resumed by closing the starting switch, there will be no tendency for the servo-mechanism to operate. This is due to the fact that relay F remains energized and prevents section STf of the start switch from energizing relay C. Hence when the start switch is operated, pumping is resumed and the cycle continues normally. When relay D releases at the end of the pumping cycle, relay E is energized to change active valves.

Interrupt or stop

In case it is desired to interrupt pumping, it is only necessary to close interrupt switch SH. This energizes the winding of relay G. This opens the circuit for the active valve winding to permit the valve to close but leaves other circuits as they were. When the start switch is energized, resumption of pumping occurs without operation of the servo-mechanism in a manner similar to resumption of pumping during the second half of a two stage cycle.

If it is desired to stop a pumping cycle, stop switch SP is operated. This opens the main line going to the windings for relays C and D. The deenergization of both of these relays results in all other relays going to normal position and deenergization of the valve winding. A succeeding operating cycle may be initiated in a conventional manner.

Manual valve control

If it is desired to use one or the other valve and not alternate, selector switch SS is moved. If the switch arms are moved in one direction from the center position, then one valve and its indicating light will be active. If the movable switch arms are moved to the other side, then the other valve and light will be active. The operation of the entire system, except for the alternate selection of valves by relay E, will be the same as has been previously described. Relay E will be operated as before but its operation will have no effect upon the selection of valve with the selector switch in the nonautomatic position.

Detailed circuits

The circuits under different operating conditions will now be traced.

With L1 and L2 energized by alternating current, relays B, E and the heater of N are energized. This current goes from L1 to the lower terminal of B4, through B4, wire BS, start switch section STb (normally closed) to L2. Also current goes from L1, through normally closed contacts D11, D12, wire L′1, through E4, wire NE, contacts N21, N22 to L2. From the top terminal of E4, a branch goes to the bottom terminal of N4, through heater N3, contacts N12 and N11, to L2. Thermostatic element N2, under the influence of heater N3, closes against contact N31, thus energizing N4. When relay N closes, a circuit from L′1 through E4, wire NE, contacts N21 and N22 is broken to L2. Thus E is deenergized and rests in the new contact position assumed upon energization of E. Relay E however, merely controls which valve and valve indicating light will be available, assuming selector switch SS is in the automatic position shown.

When start switch ST is operated, the following circuit changes occur. Section STb opens the B4 circuit so that relay B deenergizes and closes its contacts. Section STj opens some circuits but normally this is immaterial. Section STf closes a circuit for winding C4 as follows: L2, STf, wire FST, normally closed contacts F42 and F41 of relay F, wire ACF, wire AC3, winding C4, wire AC2, wire LAd, stop switch SP to L1. Relay C closes and locks itself in as follows: L2, relay contacts C23 and C21, wire CA3, relay contacts A31 and A32, wire AC3, relay winding C4, wire AC2, wire LAd and through normally closed stop switch SP to L1. A branch lamp circuit is also established for indicating a delay period, this circuit branching off from wire AC3 to wire ALd, delay lamp Ld and then through stop switch SP to L1.

When start switch ST is released, relay B returns to normal and provides a shunt circuit around relay contacts A31—A32 as follows: A32, wire AC3, wire ACB, relay contacts B11 and B12, wire CAB, wire CA3 and relay contact A31. As has been pointed out before, this shunt circuit through relay contacts B11 and B12 is to give the servo-mechanism time to operate in case relay A happens to open contacts A31 and A32. The conditions for relay A being energized and opening contacts A31 and A32. The conditions for relay A being energized and opening contacts A31 and A32 will be considered later.

Relay C

When relay C is energized, it closes an energizing circuit for relay D as follows: L2, relay contacts C11 and C13, wire CD, wire DC, winding D4, wire DG, wire FG, relay contacts F31 and F32, wire FH, wires GH4 and ACG, wire AC2, wire LAd, stop switch SP and wire L1.

The energization of relay C also completes the fourth arm of rectifier system U. The circuit is as follows: Point U3, wire CU3, wire CC3, relay contacts C41 and C43, wire CU4 back to the rectifier connected to point U4. The output potential of system U is substantially higher for full wave operation as compared to half wave operation. Filtering of the full wave rectifier system output is obtained by bridging condenser U8 of substantial capacitance across the rectifier system. This circuit is as follows: point U5, wire UTk, condenser U8, wire CU, relay contacts C33 and C31, wire CU3 to bridge point U3.

The bias of grid Tg with respect to cathode Tk is also adjusted when relay contacts C31 and C32 open. The cathode to grid circuit is as follows: Tk, resistor TUa to wiper TUb, resistor TUc and wire TUd to grid Tg. When relay C is deenergized, grid Tg is directly connected to point U3 through wires CT and CU3. The change in bias of Tg is necessary, since the full potential across the rectifier input during motor operation is far greater than cut-off.

The energization of relay C also completes an operating circuit for motor M. This circuit runs from motor M along wire CM, through contacts C51 and C53 along wire CQ, through Q and back to motor M along wire MQ. Thus motor M will be driven by the output of amplifier Q, providing potential conditions are suitable. Motor M drives wiper 18 along resistor 17.

Network R is set up as follows: when relay C is energized, junction R9 is connected through wires RC6 and CR6 and relay contacts C61 and C63 to junction R6. Between R1 and R2, resistors R11 to R14 inclusive are connected in series. From R6 to R7 a branch is provided consisting of R17. Between R2 and R7, the alternating potential is constant at all times. Thus the output of load cell P is impressed in series with the potential between wipers R16 and R18. The alternating potentials must be 180° out of phase and when equal cancel out in the input side of amplifier Q. Thus when the potential difference between PQ and QR is zero, the amplifier is balanced and motor M will stop. Condenser U8 across the rectifier output also stabilizes servo operation in case of motor hunting.

Relay D

Relay D, which closed when relay contacts C11 and C13 closed on energization of relay C, locks itself in as follows: L1, stop switch SP, wire LAd, wire AC2, wire ACG, wires GH4 and FH, relay contacts F31 and F32, wires FG and DG, D4, DC, wire CD, relay contacts D21 and D23 to L2.

The energization of relay D opens contacts D11 and D13 thus opening the circuit for the windings of relay N and ratchet relay E.

When relay D is energized, contacts D11 and D13 close. These two contacts are in a number of operating circuits to be considered later. However, the common part of these operating circuits runs from L1 to relay contacts D11 and D13 to wire DF. From wire DF, branch connections go to various components. In order for pumping to take place, relay contacts D11 and D13 must be closed.

Relay A

Relay A has its operating winding A4 in series with tube T so that A is energized only when tube T has a discharge through it. Thus, beginning with transformer winding T4 as a source of potential, the circuit continues along wires T5 and AT through winding A4, along wire TA to anode Ta, cathode Tk to wire TU2 and back to the transformer winding. Condenser T1 across winding A4 prevents chattering of relay A over half cycles.

As has been previously pointed out, the grid to cathode bias arrangement is such that tube T does not fire as long as the potential available at the input of rectifier bridge U is sufficient to operate motor M. When the potential derived from network R equals the potential across P, amplifier Q will no longer have enough potential at its output for driving motor M or keeping tube T cut-off. Hence, when tube T fires, relay A is energized.

When relay A is energized, its contacts A32 and A31 in the holding circuit for winding C4 open and cause relay C to be deenergized. These circuits have been traced. Briefly, however, motor M is opened, the grid bias resistor network for T is rearranged, one arm of rectifier system U is opened and network R is rearranged. Junction R9 is disconnected from junction R6 (contacts C61 and C63 are now open) and instead is connected through relay contacts C61 and C62 to wiper R20 operating over resistor R19. The lower terminal of R19 is connected through wire KR4, contacts K41 and K42 and wire RK4 to junction R1. Thus the potential between wipers R16 and R18 due to network R is increased by this change in network connections. The increase is determined by the position of R20 on resistor R19. Because of the network arrangement, the increase in potential may be calibrated as a percentage increase over the potential between R16 and R18 in the first network arrangement. This first network arrangement, with relay C energized, may be considered as the preliminary network arrangement. The network arrangement with relay C deenergized and as traced above may be considered as the final network arrangement. With relay C off, the final network arrangement disturbs the potential balance at the input of amplifier Q, attained when the servo system reached balance. This new potential difference at the amplifier input will remain, in a normal pumping cycle, until the ham weight reaches the prescribed value.

Returning back to relay A, when A and C are both deenergized, an important connecting link between L2 and operating circuits is established. This link is as follows: L2, relay contacts C11 and C12, wire AC, relay contacts A12 and A11, and wire AGS. From wire AGS, branches to be later described, are connected. These various branches are connected in parallel between wire AGS and wire DF from the first named link controlled by relay contacts D11 and D13.

Thus one operating branch runs from wire DF through winding F4, wire HF to wires HG2 and SHG to wire AGS and contact A11. With relays A and C deenergized and relay D energized, relay F becomes energized. A locking circuit for relay F around relay contacts C11, C12, A12 and A11 is established as follows: wire L2, contacts F21 and F23, wire HF to wire HG2, wires SHG and AGS to relay contact A11.

The energization of relay F opens contacts F31 and F32. This does not disable relay D, as an alternative energization circuit through contacts A21 and A22 exists, as long as relay A is deenergized. This alternative circuit is as follows: wire L1, stop switch SP, wires LAd and AC2, relay contacts A21 and A22, wire ADG, wire FG to relay contact F32.

The energization of relay F also opens contacts F41 and F42 in the start switch section STf so that relay C will not be energized when the start switch is operated.

A second branch circuit between the D11—D13 and relays A and C links is also established when relays A and C are off and D is on. This may be traced as follows: D13, wires DF and DST, switch section STj, wire HSj, relay contacts H32 and H31, wire HG3, relay contacts G32 and G31, wire GV to one or the other of valve windings V4 or V'4 (depending upon the position of relay E or switch SS). The circuit continues through V'4 (as shown) wire V'Sg, wire ESg, relay contacts E22 and E21, wire ESf, switch contacts SSf and SSd, wires SSS, SLp, SHG, AGS and relay contact A11. Thus pumping through valve V' is initiated.

At the same time an indicating lamp branch circuit is established as follows: relay contact G31 (common to both valve and lamp circuits) wires GV, VLp, lamp Lp, wire SLp. This merely shows pumping. To show which valve is active, the following circuit controlled by relay E or switch SS is established: wire L2, switch contacts SSa and SSc, wire SEc, relay contacts E11 and E12, wire ESp, lamp LV' to wire L1.

As the ham is pumped and its weight increases, the potential at the output of cell P will approach the final potential in the network R in series with P. When the two potentials balance, tube T fires and relay A thereupon is energized.

The firing of tube T at the end of a pumping cycle, hereinafter referred to for convenience as terminal firing, has no effect on relay C, this having been deenergized when servo balance conditions were present. The energization of relay A disables relay D. It will be remembered that when relay D first went to a closed position (when C closed), there were two shunt paths involving relay contacts F31 and F32 in one path and A21 and A22 in the other path. The subsequent energization of relay F, coincident with the establishment of pumping circuits, opened contacts F31 and F32. Hence, when normally closed contacts A21 and A22 open, the energizing circuit for winding D4 is broken. This opens relay contacts D11 and D13 in the link to the pump circuits and disables relay F, permits the valve to return to a normally closed position and extinguishes the corresponding indicating lamp. Lamp Lf, indicating the termination of a pumping cycle is energized through relay contacts D11 and D12, normally closed. This lamp circuit can be traced as follows: L1, relay contacts D11 and D12, wire L'1, lamp Lf, wire L2f and wire L2.

At the same time, the normally closed relay contacts D11 and D12 set up operating circuits for relays N and E. These have been described in connection with the initial energization of the system.

Interruption and stop

In case it is desired to interrupt the entire process at any point, switch SH is operated. This provides a branch circuit between the D11—D13 link and the A11—A12 link. Thus beginning with relay contact D13, a circuit branch goes through wires DF, DST, switch STj, wire HSj, relay contacts H32, H31, wires HG3, and HG4, winding G4, wires SG4 and GSH, through switch SH, wires SHG and AGS to relay contact A11. Wire SHG is also connected to wires HG2 and HF to relay contact F23. Hence, when pumping occurs and relay C is open at C11 and C12, an alternative circuit from switch SH through relay contacts F23 and F21 to wire L2 is provided. The interrupt circuit is therefore effective when relay D is energized on the one hand and relays A and C are deenergized or relay F is energized on the other hand.

Relay G locks itself closed.

The locking circuit is as follows: relay winding G4, wire SG4, relay contacts G23 and G21, wires HG2 and HF to relay contact F23. The energization of relay G opens contacts G31 and G32. Relay contact G31 is connected through wire GV to the windings of valves V and V'. Hence the active valve would be closed. All other system components would remain as is.

Upon operation of start switch ST, the cycle continues. Section ST*j* is ineffective because relay contacts F41 and F42 are open, relay F remaining energized. Thus relay C is not energized. Section ST*j* opens up the circuit to winding G4 so relay G releases. Section ST*j* is not in the circuit for winding F4 of relay F so this relay is not disturbed. Hence, when the start switch is released, the now normally closed contacts G31 and G32 complete the pumping circuit.

For stopping, switch SP is operated. This switch is between L1 and the windings for relays C and D. When both of these relays are open, the system reverts to the condition prior to a normal operating cycle. In the event that pumping has started prior to the operation of stop switch SP, the release of relay D is followed by the same consequences as when the cycle terminates normally and relay D releases. This applies to the operation of relay E alternating the active valves.

*Two stage pumping*

For certain hams, it is necessary to divide the pumping cycle into two stages. Before the ham has been pumped to the predetermined part of the weight increase, switch HS is operated. This closes a circuit for energizing relay K as follows: relay contacts D11 and D13, wire DF, wire JS*j*, wire KS*j*, winding K4, wire KHS, switch HS, wire L2.

The energization of relay K (this occurs only after pumping starts) rearranges network R so that instead of the normal weight increase potential, only one-half (or any other desired proportion) will cause pumping to cease.

Thus the lower terminal of R19 is connected directly to junction R5. The connecting circuit is wire KR4, normally closed relay contacts J41 and J42, wire JK3, relay contacts K31 and K33, wire RK3 and junction R5. At the same time, the connection between R1 and resistor R19 is broken at relay contacts K41 and K42. The new network connections so established provide that new network potential to be matched by the weight derived potential. When the ham weight reaches the predetermined mid-pumping point, a pump suspending circuit through contacts of relays A, K, F, G and J is established. This circuit branches off from start switch section ST*j*. The circuit is as follows: switch ST*j*, wires HS*j*, H4S*j*, winding H4, wires H4J2 and HJ2; relay contacts J22 and J21, wire GJ, contacts G11 and G12, wire GF, contacts F11 and F13, wire KF, contacts K13 and K11, wire AK, contacts A13 and A11, wires AGS, SHG, HG2, HF, contacts F23 and F21 to L2. The energization of relay H causes it to lock itself. The locking circuit is: H4, wires H4J2, HJ2, relay contacts H23 and H21 and wire HG2.

A lamp circuit to indicate the end of the first part of the two stage pumping cycle is also established as follows: wires H4S*j*, HS*j*, lamp L*h*, wire LH*h* to wire HJ2 and then on as for the energizing or holding circuits for relay H.

The energization of relay H opens contacts H31 and H32 in the valve winding circuits. Hence pumping stops. The energization of relay H causes contacts H11 and H13 to close and thus energizes relay J. This circuit is as follows: contact D13, wires DF and JS*j*, winding J4, wire HJ, contacts H13 and H11 to L2. Relay J locks itself in when contacts J11 and J13 close.

The energization of relay H also provides an alternative circuit between stop switch LA*d* and winding D4 of relay D. Relay K, which has been closed earlier, has contacts K21 and K23 in series with normally closed contacts J32 and J31 for maintaining current through D4. When relay H closes its contacts H41 and H43 provide a shunt around opened contacts J31 and J32 to keep relay D closed.

The closure of relay J restores normal conditions to network R. Thus closed contacts J41 and J43 restore the connection normally provided by contacts K41 and K42. Open contacts J41 and J42 break the link which has been closed by contacts K31 and K33. Thus the network derived potential will now call for a full weight increase.

After the pumping needle has been moved in the ham, start switch ST is operated to initiate the last part of the pumping cycle. Relay F, which has remained closed, prevents switch section ST*f* from energizing relay C. Thus the servo system is not affected.

Switch section ST*j* is the only part of the start switch which is effective. Opening of the switch contacts breaks the energizing circuit for relay H, since current from L1 passes through the switch. Contacts H31 and H32 are closed when relay H releases. Thus when switch section ST*j* is released to closed position, the pumping circuit is reestablished. The network derived potential, which calls for full pumping now, will not be balanced until the pumping cycle is completed. Then relay A is energized by the firing of tube T and the entire system reverts to normal. Relays J and K both release.

If manual selection of active valves is desired, switch SS is operated. When contacts SS*a* and SS*d* are moved counterclockwise, contacts SS*b* and SS*c* are made. This puts shunts around contacts E11, E12 on the one hand and E21, E23 on the other. This provides for valve V and its panel light to be effective only. The other switch position selects valve V'.

We claim:

1. In a weighing system in which the article being weighed is subject to processing causing a change in base weight and in which the processing is to be terminated after said article has changed weight by a predetermined percentage of its base weight, the combination of means for generating a potential whose value is proportional to the base weight of said article, additional means for providing a second potential, servo means for varying said additional means, potential responsive means having normal and off-normal electrical conditions when said two potentials are respectively substantially unequal and equal, means for supplying said two potentials to said potential responsive means, means for operating said servo means only when said potential responsive means is in its normal condition to vary said second potential in a direction to equalize the two potentials, process control means, including a winding, having active and inactive positions, relay means for maintaining said process control means inactive while said servo means is operative, relay means for modifying said second equalized potential by a desired proportion and for disabling said servo means, relay means for activating said process-control means when said second potential has been equalized and when said servo means has been disabled, relay means for maintaining said servo means disabled while said article weight is changing during processing and means for deactivating said process control means after said first potential has changed from the base weight potential to a value substantially equal to the modified potential.

2. In a weighing system in which the article being weighed is subject to processing causing a change in base weight and in which processing is to be terminated after said article has changed weight by a predetermined percentage of its base weight, the combination of means for generating a potential whose value is proportional to the base weight of said article, additional means for providing a second potential, servo means for varying said additional means, potential responsive means having normal and off-normal electrical conditions when said two potentials are respectively substantially unequal and equal, means for supplying said two potentials to said potential responsive means, means for operating said servo means only when said potential responsive means is in its normal condition to vary said second potential in a direction to equalize the two potentials, process control means, including a winding, having active and inactive positions, a control relay having cooperating contacts for controlling circuits and having normal and off-normal positions, said control relay cooperating contacts being connected in the circuit of the winding of said process control means and in the circuit for operating said servo means, said control relay contacts also having connections to a network connected to said additional means for providing a second potential, said network when connected to said additional means serving to change said second potential by a predetermined proportion thereof, said control relay in normal position having cooperating contacts arranged so that the circuit for the process control means is closed at said relay, said control relay contacts in normal position connecting said network to said additional means for providing a second potential, said control relay in the off-normal condition closing the circuit for said servo means, means including a starting switch for operating said control relay to put said control relay in an off-normal position, means for locking said control relay in its off-normal position, means controlled by said potential responsive means in its off-normal condition for unlocking said control relay to return it to its normal position at which time the process control means becomes operative and the servo means becomes disabled and the second potential has been changed so that it is no longer equal to the base weight potential, and means controlled by said potential responsive means for disabling said process control means when the article weight has reached equality with the modified second potential.

3. The system according to claim 2 wherein said potential responsive means includes a grid controlled gas discharge device, means for biasing the control grid so that the device maintains a normal electrical condition, means controlled by certain contacts of the control relay for impressing one bias upon said control grid when said control relay is in normal position and for impressing a substantially different bias when said control relay is in off-normal position, said control grid bias in the normal position of the control relay functioning on a potential basis and in the off-normal position of the control relay functioning on a phase difference basis, and means for supplying pulsating current to the cathode anode circuit of said gas discharge device.

4. The system according to claim 3 wherein said grid controlled gas discharge device has a source of alternating current in a rectifying system for energizing the input and output circuits thereof and wherein said control relay has contacts connected to said rectifier system so that in the normal position of said control relay the rectifier system is connected as a half wave system and in the off-normal position of the control relay the rectifier system is connected as a full wave system.

5. The system according to claim 2 wherein the starting switch is provided and has a pair of contacts, an additional relay having a winding controlled by said switch contacts, and connections between contacts controlled by said additional relay and the winding of said control relay whereby said control relay is energized to dispose the same in off-normal position while the starting switch is operated to provide time for the servo mechanism to reach a balance independently of other contact and circuit connections controlled by said control relay.

6. The system according to claim 2 wherein said potential responsive means comprises a grid controlled electron discharge device.

7. In a weighing system in which the article being weighed is subject to processing causing a change in base weight and in which the processing is to be terminated after said article has changed weight by a predetermined percentage of its base weight, a load cell including a resistor sensitive to mechanical force for varying the value thereof in proportion to the variation in weight upon a scale platform, means for applying a predetermined potential to said load cell, said load cell having an output potential which varies in proportion to the weight of an article upon said scale platform, a network and separate potential source for providing a second potential, servo means for varying said network to change said second potential, potential responsive switching means having normal and off-normal conditions when said two potentials are respectively substantially unequal and equal, means for supplying said two potentials to said potential responsive switching means, said servo operating means tending to vary said second potential in a direction to equalize the two potentials and thus operate the potential responsive switching means, process control means, control relay means having a normal position for rendering active said process control means and for modifying said network to change said second potential by a desired proportion, said control relay means in off-normal position completing a circuit for the servo means, additional relay means for maintaining said servo means disabled while said article weight is changing during processing, means for deactivating said process control means after said first potential from the load cell has been changed so that it is substantially equal to the modified potential and starting means for initially setting said control relay means to an off-normal position to initiate an operating cycle for said system.

8. The system according to claim 7 wherein said starting means includes means for maintaining said control relay means in an off-normal position while said starting switch is being operated for the purpose of providing a time delay during servo operation.

9. The system according to claim 7 wherein said potential responsive switching means includes a grid controlled gas discharge tube having cathode, control grid and anode, a source of alternating current and a rectifier system for energizing the grid and anode circuits of said discharge tube, and means controlled by said control relay means for transforming said rectifying means into a half wave rectifier system in the normal position of said control relay means and into a full wave rectifier system in the off-normal position of said control relay system.

10. The system according to claim 9 wherein a resistance network is provided in the power supply to the gas discharge tube and wherein the bias potential impressed upon the control grid is changed when the rectifier system is changed so that the grid controlled gas discharge tube in the normal position of the control relay means operates on a difference in phase between the control grid and anode whereas in the off-normal position of said control means, the bias on the control grid is such that the operating characteristics of the control grid are dependent substantially only on potential and not on phase.

11. The system according to claim 7 wherein manually controlled switching means are provided for applying a potential derived from said modified potential but having a value intermediate the equalized potential and modified potential, said intermediate potential being applied to said potential responsive means, said process control means being deactivated when an intermediate point in the processing has been reached, and additional switching means for preventing said control relay means from going to an off-normal position upon operation of said start switch for renewing the operating cycle.

WALTER E. MOSS.
ORLANDO GARAPOLO.

References Cited in the file of this patent

UNITED STATES PATENTS

| Number | Name | Date |
|---|---|---|
| 2,581,204 | Reilly, Jr. | Jan. 1, 1952 |
| 2,581,205 | Reilly, Jr. | Jan. 1, 1952 |
| 2,605,694 | Moss et al. | Aug. 5, 1952 |